Feb. 15, 1966     P. C. SKEELS ET AL     3,234,655
INSPECTION SYSTEM
Filed June 13, 1961     2 Sheets-Sheet 1
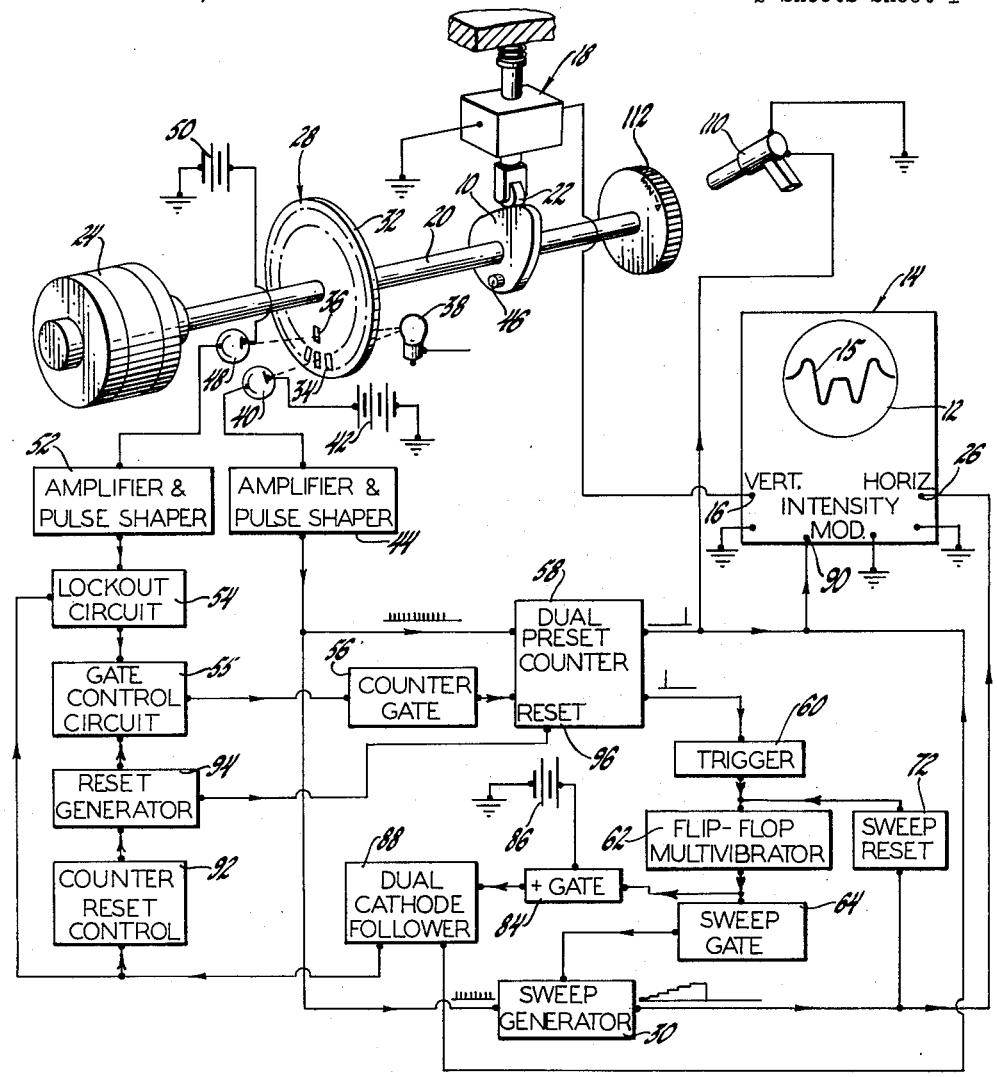
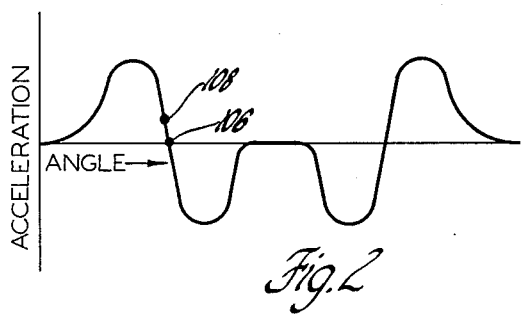
Fig. 2
INVENTORS
Paul C. Skeels
Charles D. Porker &
Marvin K. Stark
BY Hugh L. Fisher
ATTORNEY Feb. 15, 1966  P. C. SKEELS ET AL  3,234,655
INSPECTION SYSTEM Filed June 13, 1961  2 Sheets—Sheet 2

INVENTORS
Paul C. Skeels
BY Charles D. Parker &
Marvin K. Stark

Hugh L. Fisher
ATTORNEY

United States Patent Office 3,234,655
Patented Feb. 15, 1966

3,234,655
INSPECTION SYSTEM
Paul C. Skeels, Ann Arbor, Charles D. Parker, Howell, and Marvin K. Stark, Milford, Mich., assignors to General Motors Corporation, Detroit, Mich., a corporation of Delaware
Filed June 13, 1961, Ser. No. 116,796
26 Claims. (Cl. 33—174)

This invention relates to an inspection system and particularly to a system of a character that affords a visual display of a test specimen characteristic.

The inspection of irregularly shaped specimens for accuracy of certain parts thereof, e.g., the contour, often presents problems. Exemplary are the cams on a conventional vehicle engine camshaft. A dimensional check of the cam contour could reveal no appreciable errors, whereas, actually the acceleration characteristics may not correspond to those demanded. This could occur due to slight depressions or other defects in the cam surface. Since acceleration is not a dimensional characteristic, but instead is a function of speed, which in turn is a function of distance, the problem becomes even more complicated. Therefore, the acceleration characteristics of a cam cannot be conveniently checked by the usual dimension gages without demanding considerable time and special ability on behalf of the inspector. This, of course, is undesirable when mass production schedules must be met.

For overcoming these and other problems, the invention contemplates a unique system particularly suited for accurately inspecting irregularly shaped specimens. By the system, both dimensional and non-dimensional characteristics as well as the point of occurrence of the characteristic can be visually checked by a simple comparison without requiring any special technique or ability on the part of the inspector.

More specifically stated, the invention utilizes an oscillograph for visually displaying a pattern corresponding to a certain test specimen characteristic to be observed. The movement or generation of the pattern across the display medium is coordinated with the motion of the test specimen. Consequently, the display of the pattern starts at a certain point having a predetermined relation to a reference point on the test specimen and continues until all of the portion of the test specimen to be inspected can be seen. Thereafter, the pattern is repeated at some desired frequency. During each sweep or development of a pattern, a certain amount of the pattern can be emphasized so as to enable the displacement of this emphasized portion to be accurately checked.

The foregoing and other objects and advantages of the invention will be apparent from the following description and from the accompanying drawings in which:

FIGURE 1 is a block diagram of a system embodying the principles of the invention;

FIGURE 2 is a graphical representation of a pattern developed by the system;

Figure 3:
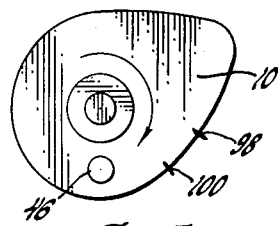
FIGURE 3 is an enlarged view of a test specimen.

The system illustrated in detail by FIGURE 1 permits the acceleration characteristics of a test specimen to be visually observed. In this embodiment, the test specimen is a cam 10 such as that utilized on the camshaft of an automotive vehicle engine. Because of the nature of the use of the cam 10, it is the acceleration characteristic that is most important, for the dimensions may be relatively accurate, but the desired acceleration produced by the cam 10 may be in error. This error may be of a sufficient magnitude to interfere with the proper operation of the engine, keeping in mind that the cam is supposed to operate the engine valve in a certain sequence. For this reason, it is important that the values be opened and closed at the proper time and at the proper rate.

In the FIGURE 1 system, the acceleration characteristics of the cam 10 are displayed on a screen 12 of a cathode ray oscilloscope 14. To accomplish this, the acceleration is utilized to produce a vertical deflection of the electron beam, and the angular displacement of the cam 10 produces the horizontal displacement so that a trace similar to that denoted by the numeral 15 is generated.

The acceleration in the form of an electrical signal suitable for supply to the vertical input 16 of the oscilloscope 14 is developed by an appropriate transducer as an accelerometer 18. The accelerometer 18 may be of any known kind such as a Donner model #4310, which is of the seismic mass servo balanced type. In order to check the cam 10, it is installed on a shaft 20 adjacent the accelerometer 18 so that the periphery of the cam 10 engages a follower 22 forming a part of the accelerometer 18. The shaft 20 is then revolved at a constant speed by a suitable motor 24. This rotation or angular displacement of the cam 10 will move the follower 22 vertically up and down and generate the acceleration signal.

As mentioned, the horizontal deflection of the oscilloscope electron beam reflects angular displacement. Hence, an angular displacement signal is supplied to a horizontal input 26 for the oscilloscope 14. This angular displacement signal is developed by a pulse generator, which is viewed generally at 28 and which produces a train of pulses that are fed to an integrating circuit such as a sweep generator 30. The sweep generator 30 in a known way integrates this train of pulses to produce a staircase shaped output voltage representing the angular displacement signal. This displacement signal then deflects the oscilloscope electron beam horizontally in an incremental way.

The pulse generator 28 utilizes a wheel 32 that has a row of slots 34 at the outer edge thereof and a single slot 36 displaced slightly radially inwardly from the slots 34. The slots 34 are preferably 2,160 in number and are equally spaced so as to be ten minutes of arc apart. The wheel 32 is likewise positioned on the shaft 20 between a light source 38 and a photocell 40. By interconnecting the photocell 40 with a voltage source 42 and with the input to the sweep generator 30, 2,160 pulses will be developed each time the wheel 32 is revolved one revolution by the motor 24. To insure that the pulses have sufficient energy and are equal, an amplifier and pulse shaper 44 is included in the input to the sweep generator 30.

As so far described, one complete revolution of the cam 10 will cause a complete trace 15 to be developed across the screen 12, the electron beam being deflected horizontally in equal increments corresponding to angular displacement and vertically in accordance with the acceleration signal. At this point a comparison could be made between the trace 15 and a reference template if wanted. However, it may be that only a portion of the cam 10 need be checked because most of the cam 10 produces a zero acceleration. Also it may be desired to angularly locate quickly a point of error by merely viewing the screen 12; of course, by reproducing only the portion of the cam 10 to be checked and displaying it over the entire screen 12 even greater accuracy can be achieved, and time saved as well, which is significant with volume production.

Consequently, the pulse generator 28 is also used to start the sweep generator 30 at the exact time when the follower 22 on the accelerometer 18 moves into the area on the periphery of the cam 10 that is to be checked.

This is done by having the slot 36 aligned with a reference point on the came 10, as a locater dowel 46. Again, as the wheel 32 is revolved, and the slot 36 passes the light source 38, a photocell 48 and a voltage source 50 will develop a single control pulse. This pulse may similarly be increased and shaped if needed by an amplifier and pulse shaper 52 and fed successively to a lockout circuit 54 and a gate control circuit 55. When the single control pulse occurs, it will cause the gate control circuit 55 to open a counter gate 56 for a dual preset counter 58 of any suitable type capable of developing two outputs at specific counts. The input of the counter 58 is connected to the output of the photocell 40 and therefore with the counter gate 56 open, the counter 58 will start to count the train of pulses reflecting angular displacement. At a certain preset count, which will be determined by the point along the periphery of the cam 10 where a check is to commence, an output or sweep generator starting pulse will be developed by the counter 58 and supplied to a trigger 60. The trigger 60 upon occurrence of the pulse will change the state of a multivibrator 62 of the flipflop type such that a sharp output pulse from the multivibrator 62 will open a sweep gate 64 so as to allow the sweep generator 30 to commence operation and perform the horizontal deflection of the oscilloscope electron beam.

Figure 4:
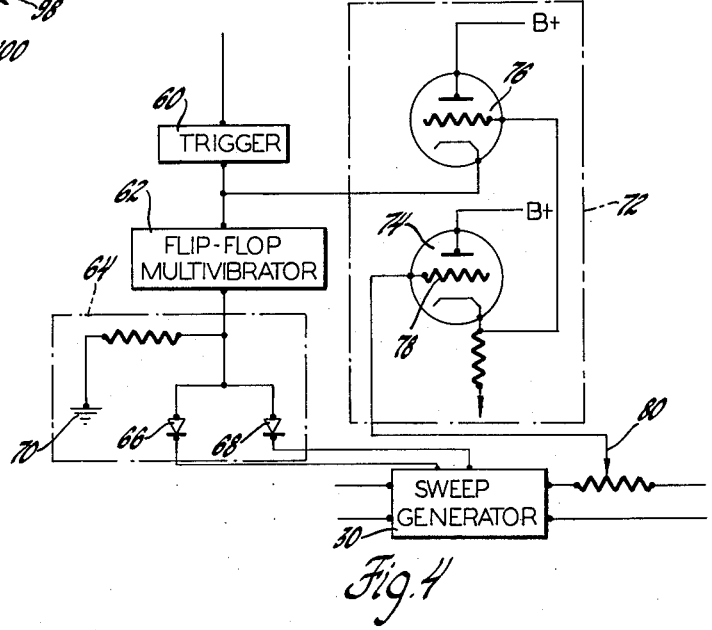
FIGURE 4 is a circuit diagram of a portion of the FIGURE 1 system and illustrates the operation of a sweep reset employed thereby.

The sweep gate 64 is shown in detail in FIGURE 4 and includes two diodes 66 and 68 connected to the sweep generator 30. In the absence of a signal from the multivibrator 62, the anodes of the diodes 66 and 68 are connected to ground at 70, and therefore, by connecting the grounded diodes 66 and 68 to an appropriate part of the sweep generator circuitry, the sweep generator 30 is rendered inoperative. Upon the occurrence of a negative pulse from the multivibrator 62, the diodes 66 and 68 will be cut off and the sweep generator 30 will be allowed now to operate until the output voltage reaches a certain value determined by the point along the cam periphery where the checking is to terminate.

To stop the sweep generator 30 at the desired point along the cam periphery, a sweep reset viewed generally in FIGURE 1 at 72 is employed. Sweep reset 72 has the input thereof connected to the output of the sweep generator 30 so as to sample the output voltage and has the output thereof connected to the input of the multivibrator 62. When the output voltage from the sweep generator 30 reaches a certain value, the sweep resets 72 will develop an output pulse that will cause the multivibrator 62 to flip back to its original state and thus close the sweep gate 64 so as to stop the sweep generator 30.

Details of the sweep reset 72 are also seen in FIGURE 4. As seen, the sweep reset 72 includes two triodes 74 and 76. Triode 74 has a grid 78 connected by an adjustable tap 80 to the output of the sweep generator 30 so as to sample the output voltage. Of course, the adjustment of the tap 80 will be determined, as has been suggested, by the point at which checking of the periphery of the cam 10 is to cease. In other words, the sweep length is controlled by the adjustment of the tap 80. At this point where the checking is to end, the voltage will be sufficiently positive to render the triode 74 conductive. Hence, since the triode 74 has the cathode thereof coupled to the grid of the triode 76, the conduction by the triode 74 will also cause the triode 76 to be conductive. By having the cathode of the triode 76 connected to the input of the multivibrator 62, the multivibrator will flip back to the original state and the sweep gate 64 will again be closed.

The negative signal from the multivibrator 62 is additionally supplied to a plus gate 84 and will, when it occurs, open the plus gate 84 to thereby connect a voltage source 86 to the input of a suitable switch, e.g., a dual cathode follower 88. The dual cathode follower 88 will develop two output voltages each of which will follow exactly in time and magnitude the input votage from the plus gate 84. One of the outputs from the dual cathode follower 88 is connected to the intensity modulation input 90 to the oscilloscope 14 so that the signal from the output of the dual cathode follower 88 will unblank the electron beam, i.e., cause the beam to be brought up to a visible level adequate to permit the trace 15 to be seen. Consequently, at the time the sweep generator 30 starts to integrate the train of input pulses, the intensity of the electron beam will be simultaneously increased to a visible level.

The other output from the dual cathode follower 88 operates the aforementioned lockout circuit 54 and also serves to reset the counter 58. To accomplish this reset function, the positive voltage from the dual cathode follower output is applied to a counter reset control 92, which is essentially a one-shot multivibrator. As long as the voltage is positive or going positive, the state of the counter reset control 92 will be maintained. But, when the sweep voltage, i.e., the displacement signal from the sweep generator 30 starts to decrease due to the operation of the sweep reset 72 in flipping the multivibrator 62, the counter reset control 92 will become effective. This is because the same pulse that closes sweep gate 64 and causes the sweep voltage to go to zero, also closes the plus gate 84. Consequently, the output voltage from the cathode follower 88 will also approach zero, a condition that will cause the control 92 to generate a reset pulse. This reset pulse will be applied to a reset generator 94, which will supply a voltage to a reset 96 for the counter 58. The voltage applied to the reset 96 resets the counter 58 to the zero state so that the counter 58 is prepared to accept the next input pulse coming from the photocell 48 via the gate control circuit 55 and the counter gate 56.

The reset generator 94 produces a second voltage pulse for causing the gate control circuit 55 to close. The gate control circuit 55 in turn closes the counter gate 56 and stops the counter 58 from counting. This conditions the gate control circuit 55 for reception of the next control pulse developed by the photocell 48.

When the magnitude of the one dual cathode follower output supplied to the intensity modulation input 90 approaches zero due to a decrease in the displacement signal from the sweep generator 30, the electron beam will be blanked to thereby obscure the trace during the return interval. This feature is significant since the return trace can be obscured without resorting to any complex circuit arrangements.

The function of the lockout circuit 54 can now be appreciated since it is possible for the counter 58 to perform improperly when a part of the periphery of the cam 10 in the vicinity of the dowel pin 46 is to be observed on the oscilloscope screen 12. This can be best explained by referring to FIGURE 3. If the cam 10 is being revolved clockwise and if it is desired to check the acceleration characteristics of the cam 10 starting at point 98 and continuing around to point 100, then as the dowel pin 46 and accordingly the slot 36 pass the photocell 48, a control pulse will be generated. Assume that the arc traversed by the follower 22 in going from the dowel 46 to the point 98 is equivalent to twelve counts, whereas to the point 100 there are only five counts. The counter 58 will be set for the twelve counts so that when this count is completed, the trigger pulse will be developed for operating trigger 60, and in the way previously explained, the sweep generator 30 will become effective. The follower 22 on the accelerometer 18 will continue to trace the contour until again the dowel pin 46 and accordingly the slot 36 pass the photocell 48. When this happens, another control pulse is produced. If this control pulse is not blocked by the lockout circuit 54, the counter 58 would stop counting since the counter gate 56 would be closed by such an unblocked pulse.

Figure 5:
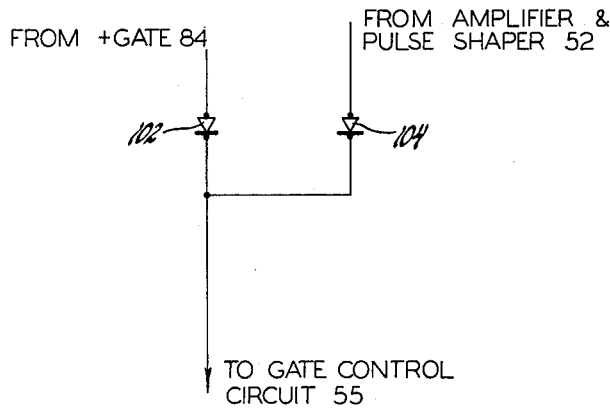
FIGURE 5 is a circuit diagram of a lockout circuit also employed in the FIGURE 1 system.

The details of the lockout circuit 54 are shown in FIGURE 5. As seen there, two diodes 102 and 104 are employed. Both of the cathodes for these diodes 102 and 104 are connected to the input to the gate control circuit 55, whereas the anode of the diode 104 is connected to the photocell 48 and the anode of the diode 102 is joined to the output of the dual cathode follower 88. Since the voltage from the dual cathode follower is always positive when the sweep generator 30 is operative, this same positive voltage will render the potential of the anode of the diode 102 greater than the pulse from the photocell 48 can render the potential of the anode of the diode 104. This in effect raises the potential of both of the cathodes above the maximum potential that the anode of diode 104 can have and hence, the diode 104 cannot conduct. When, however, the sweep generator 30 ceases to operate, this positive voltage applied to the anode of the diode 102 goes to zero and the diode 104 can again transfer current whenever a positive pulse from the photocell 48 occurs. In this way, whenever the sweep generator 30 is operating and a trace is being made on the screen 12 of the oscilloscope 14, a subsequent control pulse generated by the slot 36 will not interfere with the operation of the system.

As has been explained, certain points along the trace 15 can be inspected for phase angle or angular displacement from the reference point afforded by the dowel pin 46. To make a check, it is preferable to use a point along the trace corresponding to zero acceleration such as the zero crossing denoted by the numeral 106 in FIGURE 2. Theoretically, with a perfect cam, the point 106 should always occur at the zero crossing in the graph, i.e., the perfect cam would have a zero acceleration characteristic at point 106. Accordingly, the point 106 will occur after so many output pulses are generated by the passage of the slots 34, which for example could be 800 minutes of cam rotation. The corresponding number will be set in the counter 58 and after this number of pulses, a so-called marking or checking pulse will be produced and supplied to the intensity modulation input 90 of the oscilloscope 14. When the marking pulse occurs, the intensity of a certain spot along the trace 15 is increased. If the spot intensified coincides with the point 106, it is known that there is no error in the cam 10; but, if the bright spot occurred at a point 108, there would be displacement or phase angle error. This error can be measured by changing the setting of the counter 58 until the bright or intensified spot corresponds to the actual point of comparison, namely point 106. Then, by converting the new number set in the counter 58, the actual setting of the error can be determined, e.g., the count difference between the two preset numbers might be four. This would indicate a forty minute error since one count occurs per each ten minutes of arc.

A supplemental check of the angular displacement can be made by installing a strobotron light 110 opposite a wheel 112 having a graduated degree scale along the edge thereof. By using the marking pulse to fire the strobotron light 110, the angle can be read from the visually stopped degree scale on the wheel 112.

Although the particular embodiment described is intended for ascertaining acceleration and phase angle or angular displacement, it will be appreciated by those skilled in the art that the system can be utilized to display any variable and its relationship to, or with respect to, rotation. Also, the actual dimensions of an irregular contour could be checked with the system if these dimensions were considered adequate for a particular application of the system.

As can now be appreciated, the system not only displays the characteristic to be observed, but also relates it to displacement and enables a quick and accurate check to be made. The accuracy would depend on the number of slots provided and their disposition. The slots 36 were suggested as being ten minutes apart but they could be closer if the application required greater accuracy. Also, any portion of the cam 10 can be observed so that accuracy is again enhanced by providing a larger picture of that portion to be checked. Otherwise, the size would be reduced due to the need to show the entire periphery for each revolution. Of particular significance is the synchronism of the motor's rotation with the operation of the sweep generator 30 to obtain the accurate incremental development of the horizontal sweep. The dual cathode follower 88 and its use permits the counter 58 to be reset, the intensity of the electron beam to be reduced during return, and the lockup circuit 54 to be operated. These features enable the system to conform to mass production requirements without demanding that the operator of the system have a special ability or education.

The invention is to be limited only by the following claims.

What is claimed is:

1. In a system for inspecting the acceleration characteristic of a test specimen surface, means developing an electrical quantity corresponding to the acceleration characteristic of a test specimen, means producing from the electrical quantity a visible pattern corresponding to the acceleration characteristic, and means altering the intensity of a certain point along the pattern so as to permit a visual comparison between the actual occurrence of the point and the desired occurence.

2. In a system for inspecting the acceleration characteristic of a test specimen surface, the combination of means maneuvering the test specimen surface according to a predetermined scheme, a transducer responsive to the movements of the test specimen surface for producing electrical pulses corresponding to the acceleration characteristic, means generating electrical pulses corresponding to incremental displacements of the test specimen surface by the maneuvering means, means producing from the electrical pulses a visible pattern of the characteristic, and means altering a point along the pattern so as to permit the visual ascertainment of the position of a corresponding point on the test specimen surface.

3. In a system for inspecting the acceleration characteristic of a test specimen surface, the combination of means maneuvering the test specimen surface according to a predetermined scheme, a transducer responsive to movements of the test specimen surface for producing electrical pulses corresponding to the acceleration characteristic, means generating electrical pulses corresponding to the incremental displacements of the test specimen surface by the maneuvering means, a cathode ray device including means deflecting the beam thereof in different coordinate directions, the transducer and the pulse generating means communicating with the deflecting means so as to cause the beam to develop a visible pattern of the characteristic, and means modulating the intensity of the beam at a point along the pattern so as to permit the ascertainment of the position of a corresponding point on the test specimen.

4. In a system for inspecting the acceleration characteristic of a test specimen surface, the combination of means revolving the test specimen surface at a constant speed, a transducer operative in response to movements of the test specimen surface to produce electrical pulses representing the speed and angular displacement of the test specimen surface and accordingly the acceleration characteristic of the test specimen surface, means generating electrical pulses corresponding to certain increments of angular displacement of the test specimen surface by the revolving means, a cathode ray device including horizontal and vertical cathode ray beam deflecting means, the vertical deflecting means communicating with the transducer and the horizontal deflecting means communicating with the pulse generating means so that a trace of the test specimen acceleration characteristic is developed as the specimen surface is revolved, and means modulating the intensity of the cathode ray beam at a certain point and at a certain time so as to permit a visual comparison of a point on the specimen surface with a reference.

5. In a system for inspecting a displacement versus time related characteristic of a test specimen surface, means maneuvering the test specimen surface according to a predetermined scheme, a transducer producing electrical pulses corresponding to the displacement versus time related characteristic to be observed about the test specimen surface, means generating electrical pulses for each incremental displacement of the test specimen surface by the maneuvering means, means counting the incremental pulses from the pulse generating means and developing after a predetermined number of pulses are counted a checking pulse, means communicating both with the transducer and the pulse generating means for producing from the pulses a visible pattern corresponding to the displacement versus time related characteristic test specimen characteristic, and means operated by the checking pulse for emphasizing a point along the pattern so as to permit an ascertainment of the position of a corresponding point on the test specimen surface.

6. In a system for inspecting a displacement versus time related characteristic of a test specimen surface, means maneuvering the test specimen surface according to a predetermined scheme, a transducer producing electrical pulses corresponding to the displacement versus time related characteristic to be observed about the test specimen surface, means generating electrical pulses for each incremental displacement of the test specimen surface by the maneuvering means, means communicating both with the transducer and the pulse generating means for producing a pattern corresponding to the displacement versus time related characteristic, and means counting the incremental pulses from the pulse generating means and developing a starting pulse for commencing operation of the communicating means.

7. In a system for inspecting the acceleration characteristic of a test specimen surface, means maneuvering the test specimen surface according to a predetermined scheme, a transducer responsive to movement of the test specimen surface for producing electrical pulses corresponding to the acceleration characteristic, means generating electrical pulses for each increment of displacement of the test specimen surface by the maneuvering means, a cathode ray device communicating with the transducer and pulse generating means so as to provide a visual pattern of the acceleration characteristic, and means counting the incremental pulses from the pulse generating means and developing at a certain count a starting pulse for rendering the cathode ray device operative.

8. In a system for inspecting a displacement versus time related characteristic of a test specimen surface, means maneuvering the test specimen surface in accordance with a predetermined scheme, a transducer producing electrical pulses corresponding to a characteristic to be observed about the test specimen surface, means generating electrical pulses for each incremental displacement of the test specimen surface, means counting the incremental pulses from the pulse generating means and developing both a starting pulse and a checking pulse, means producing from the transducer pulses and the generating means pulses a visible pattern corresponding to the displacement versus time related characteristic, the pattern producing means being rendered operative by the starting pulse, and means operated by the checking pulse for emphasizing a certain point along the pattern so as to permit an ascertainment of the position of a corresponding point on the test specimen surface.

9. In a system for inspecting the acceleration characteristic of a test specimen surface, means maneuvering the test specimen surface according to a predetermined scheme, a transducer responsive to movements of the test specimen surface for producing electrical pulses corresponding to the acceleration characteristic, means generating electrical pulses for each increment of displacement of the test specimen surface, a cathode ray device arranged to produce from the electrical pulses a visible pattern of the acceleration characteristic, means counting the incremental pulses from the pulse generating means and developing a checking pulse at a predetermined count, means modulating the intensity of the cathode ray beam, the modulating means being rendered operative by the checking pulse so as to alter the intensity of a point along the pattern at a certain time and thereby permit the ascertainment of the position of a corresponding point on the test specimen surface.

10. In a system for inspecting the acceleration characteristic of a test specimen surface, means revolving the test specimen surface at a relatively constant speed, a transducer responsive to movement of the test specimen surface for producing electrical pulses corresponding to the acceleration characteristic, means generating pulses for each increment of rotation of the test specimen surface, a cathode ray device including horizontal and vertical cathode ray beam deflection means respectively communicating with the pulse generating means and the transducer so as to produce a visual pattern corresponding to the acceleration characteristic of the test specimen surface, means counting the incremental pulses from the pulse generating means and at a predetermined count developing a starting pulse for commencing operation of the cathode ray device and at another predetermined count developing a checking pulse, and means modulating the intensity of the cathode ray beam, the modulating means being operated by the checking pulse so as to increase the intensity of a point along the pattern at a certain time so as to permit the ascertainment of the position of a corresponding point on the test specimen relative to a specimen surface.

11. In a system for inspecting a displacement versus time related characteristic of a test specimen surface, means maneuvering the test specimen surface according to a predetermined scheme, a pulse generator positioned adjacent the test specimen surface and so arranged as to develop an output pulse each time a portion of the test specimen surface is within the proximity of the pulse generator, a transducer for developing electrical pulses corresponding to the displacement versus time related characteristic to be observed about the test specimen surface and over a certain portion thereof, means producing a visible pattern of the displacement versus time related characteristic from the pulses, the pattern producing means being arranged to become operative when the pulse generator develops an output pulse, and lockout means for preventing the subsequent occurrence of an output pulse from interfering with the operation of the pattern producing means.

12. In a system for inspecting the acceleration characteristic of a test specimen surface, the combination of means rotating the test specimen surface at a relatively constant speed, a transducer for developing electrical pulses corresponding to the acceleration characteristic, a pulse generator positioned adjacent the test specimen surface and responsive to movements of the test specimen surface so as to develop an output pulse each time a portion of the test specimen surface is within the proximity of the pulse generator, a cathode ray device communicating with the transducer so as to develop a visual pattern of the characteristic, the cathode ray device being so arranged as to be rendered operative by the output pulse from the pulse generator and thereafter continue operation until the test specimen surface has been displaced a predetermined amount, and lockout means for preventing a subsequently produced output pulse from the pulse generator from interfering with the operation of the cathode ray device until the test specimen surface has been displaced the predetermined amount.

13. In a system for inspecting the acceleration characteristic of a surface on a test specimen having a reference point formed thereon, the combination of means maneuvering the test specimen surface according to a predetermined scheme, means generating electrical pulses for each predetermined increment of displacement of the test specimen surface, the pulse generating means being arranged to commence operation when the reference point on a test specimen is within the proximity thereof, a transducer responsive to movements of the test specimen surface for producing electrical pulses corresponding to the acceleration characteristic, means producing from the electrical pulses a visible pattern of the characteristic, means counting the incremental pulses and developing a starting pulse for rendering the pattern producing means operative, the pattern producing means being operative to show the characteristic for a predetermined displacement of the test specimen, and means preventing the reference point from altering the operation of the pulse generating means during the time the pattern producing means is operative.

14. In a system for inspecting a displacement versus time related characteristic of a test specimen surface having a reference point formed thereon, means maneuvering the test specimen surface according to a predetermined scheme, a transducer producing electrical pulses corresponding to the displacement versus time related characteristic to be observed about the test specimen surface, means generating pulses for each predetermined increment of displacement of the test specimen surface, the pulse generating means being rendered operative by the movement of the reference point on the test specimen surface within the proximity of the pulse generating means, a cathode ray device having horizontal and vertical cathode ray beam deflection means respectively communicating with the pulse generator and the transducer so as to produce a visible pattern of the displacement versus time related characteristic, integrating means communicating with the pulse generating means so as to produce a voltage for operating the horizontal deflection means, means counting the incremental pulses and developing a starting pulse for rendering the integrating means operative at a predetermined number of pulses after the commencement of the operation of the pulse generating means, the passage of the reference point causing the pulse generating means to develop a starting pulse for commencing operation of the counter means, the integrating means operating for a predetermined number of counts adequate to visually display that part of the test specimen surface whose displacement versus time related characteristic is to be observed.

15. In a system for inspecting the acceleration characteristic of a test specimen surface having a reference point formed thereon, means revolving the test specimen surface at a predetermined speed, a transducer for developing electrical pulses corresponding to the acceleration characteristics of the test specimen surface, pulse generating means for developing both electrical pulses for predetermined increments of angular rotation of the test specimen surface and for developing a control pulse from the reference point, a cathode ray device including horizontal and vertical cathode ray beam deflection means communicating respectively with the pulse generating means and the transducer so as to develop a visible pattern of the acceleration characteristics of the test specimen surface for a certain angular displacement of the test specimen, means counting the incremental pulses from the pulse generating means and rendered operative upon the development of a control pulse so as to count a certain number of incremental pulses corresponding to the angular displacement of a starting point on the test specimen surface from the reference point, an integrating circuit communicating with the pulse generating means and arranged so as to develop a stepped output voltage for operating the horizontal deflection means of the cathode ray device, the integrating circuit being operative to produce one sweep for the certain angular displacement of the test specimen surface, and a lockout circuit arranged to prevent the control pulse from interfering with the operation of the integrating circuit once the integrating circuit has become operative.

16. In a system for inspecting the acceleration characteristics of a test specimen surface, means developing an electrical quantity corresponding to the acceleration characteristic, means producing from the electrical quantity a visible pattern corresponding to the acceleration characteristics, means altering the intensity of a certain point along the pattern so as to permit an ascertainment of the position of a corresponding point on the test specimen surface, and auxiliary means operative in synchronism with the intensity altering means for providing another check of the position of the point on the test specimen surface.

17. In a system for inspecting the acceleration characteristics of a test specimen surface, means developing electrical pulses corresponding to the acceleration characteristics, a cathode ray device communicating with the pulse developing means so as to produce a visible pattern of the acceleration characteristics, means altering the intensity of a certain point along the pattern at a certain time so as to permit the ascertainment of the position of a corresponding point on the test specimen surface, and auxiliary means operated in synchronism with the intensity altering means for also checking the position of the point on the test specimen surface.

18. In a system for inspecting the acceleration characteristics of a test specimen surface, the combination of means revolving the test specimen surface at a constant speed, a transducer operated in response to movement of the test specimen surface so as to produce electrical pulses corresponding to the acceleration characteristics, means generating electrical pulses corresponding to predetermined increments of displacement of the test specimen surface, a cathode ray device including horizontal and vertical cathode ray beam deflecting means, the vertical deflecting means communicating with the transducer and the horizontal deflecting means communicating with the pulse generating means so that a trace of the acceleration characteristics is developed, means modulating the intensity of the beam at a certain point and at a certain time so as to permit a visual determination of the position of a corresponding point on the specimen surface, a marked member also movable by the maneuvering means, and a strobotron light cooperating with the marked member and operated in synchronism with the intensity modulating means to afford a further check as to the disposition of the point on the test specimen surface.

19. In a system for inspecting the acceleration characteristic of a test specimen surface, the combination of means maneuvering the test specimen surface according to a predetermined scheme, a transducer responsive to movements of the surface for producing electrical pulses corresponding to the acceleration characteristic, means generating electrical pulses for each increment of displacement of the test specimen surface by the maneuvering means, a cathode ray device operated by the pulses so as to produce a pattern of the test specimen acceleration characteristic, and means starting operation of the device and simultaneously increasing the intensity of the pattern to a visible level after a predetermined number of pulses have been generated by the pulse generating means.

20. In a system for inspecting a displacement versus time related characteristic of a test specimen surface, the combination of means maneuvering the test specimen surface according to a predetermined scheme, a transducer producing electrical pulses corresponding to the displacement versus time related characteristic to be observed about the test specimen surface, means generating pulses for each increment of displacement of the test specimen surface by the maneuvering means, a cathode ray device operated by the pulses so as to produce a pattern of the displacement versus time related characteristic, means counting the pulses from the pulse generating means so as to develop a starting pulse after a predetermined number of pulses have been produced by the pulse generating means, and means actuated by the starting pulse for commencing operation of the device and also increasing the intensity of the pattern to a visible level.

21. In a system for inspecting the acceleration characteristic of a test specimen surface, the combination of means maneuvering the test specimen surface according to a predetermined scheme, a transducer responsive to movements of the test specimen surface for producing electrical pulses corresponding to the acceleration characteristic, means generating pulses for each increment of displacement of the test specimen surface by the maneuvering means, a cathode ray device operated by the pulses so as to produce a pattern of the characteristic, means counting the pulses from the pulse generating means so as to develop a starting pulse after a predetermined number of pulses have been produced by the pulse generating means, means actuated by the starting pulse for commencing operation of the device and also increasing the intensity of the pattern to a visible level, and means cooperating with the device so as to cause, when a complete pattern has been produced, the intensity of the pattern to be reduced to an invisible level and the counting means to be reset.

22. In a system for inspecting a displacement versus time related characteristic of a test specimen surface, the combination of means revolving the test specimen surface at a relatively constant velocity, a transducer producing electrical pulses corresponding to the displacement versus time related characteristic to be observed about the test specimen surface, means generating electrical pulses for each increment of angular displacement of the test specimen surface by the revolving means, a cathode ray device including horizontal and vertical cathode ray beam deflecting means, cathode ray beam intensity varying means, and a sweep generator communicating with the horizontal deflecting means, the vertical deflecting means communicating with the transducer and the sweep generator communicating with the pulse generating means so that the device develops a pattern corresponding to the displacement versus time related characteristic, means counting the pulses from the pulse generating means so as to develop a starting pulse after a predetermined number of the pulses have been produced by the pulse generating means, means actuated by the starting pulse for commencing operation of the sweep generator and also causing the cathode ray beam intensity varying means to increase the intensity of the beam to a visible level, and means cooperating with the sweep generator at the completion of the development of a pattern for causing the cathode ray beam intensity varying means to reduce the intensity of the beam to an invisible level and also causing the counting means to be reset.

23. The method of measuring the acceleration characteristic of a moving surface comprising the steps of developing an electrical quantity corresponding to the acceleration characteristic, producing from the electrical quantity a visible pattern of the acceleration characteristic, and emphasizing a certain portion of the pattern for measuring purposes.

24. The method of measuring the acceleration characteristic of a moving surface comprising the steps of maneuvering the surface according to a predetermined scheme, producing electrical pulses representing the acceleration characteristic of the surface, generating pulses for each incremental displacement of the surface, supplying the incremental and the electrical pulses to a device for displaying a visible pattern of the acceleration characteristic in accordance with the incremental and the electrical pulses, and starting the operation of the device after a certain number of the incremental pulses have occurred.

25. The method of measuring the acceleration characteristic of a moving surface comprising the steps of maneuvering the surface according to a predetermined scheme, generating pulses for each predetermined increment of displacement of the surface after a certain reference point, producing electrical pulses corresponding to the acceleration characteristic, supplying the electrical and the incremental pulses to a device for displaying a visible pattern of the characteristic in accordance with the incremental and the electrical pulses, commencing the operation of the device after a certain number of incremental pulses have occurred so that the acceleration characteristic is shown for a certain displacement of the surface, and preventing spurious pulses from interfering with the operation of the device during the time that the pattern is being produced.

26. The method of measuring the acceleration characteristic of a moving surface comprising the steps of maneuvering the surface according to a predetermined scheme, producing electrical pulses representing the acceleration characteristic, generating pulses for each increment of displacement of the surface, supplying the electrical and the incremental pulses to a cathode ray device for displaying a visual pattern of the characteristic in accordance with the electrical and the incremental pulses, commencing the sweep cycle operation of the device after a certain number of the incremental pulses have occurred, increasing the intensity of the pattern at the start of each sweep cycle to a visible level, and reducing the intensity of the pattern to an invisible level at the completion of a sweep cycle.

References Cited by the Examiner
UNITED STATES PATENTS 2,355,363  8/1944  Christaldi.
2,973,638  3/1961  Fluegel _____ 324—15 X ISAAC LISANN, *Primary Examiner.*